US009584938B2

(12) United States Patent
Chafe (10) Patent No.: US 9,584,938 B2
(45) Date of Patent: Feb. 28, 2017

(54) METHOD OF DETERMINING ACOUSTICAL CHARACTERISTICS OF A ROOM OR VENUE HAVING N SOUND SOURCES

(71) Applicant: Sennheiser electronic GmbH & Co. KG, Wedemark (DE)

(72) Inventor: Sebastian Chafe, Oakland, CA (US)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 55 days.

(21) Appl. No.: 14/599,907

(22) Filed: Jan. 19, 2015

(65) Prior Publication Data

US 2016/0212554 A1    Jul. 21, 2016

(51) Int. Cl.
*H04R 29/00* (2006.01)
*G10K 15/08* (2006.01)
(Continued)

(52) U.S. Cl.
CPC ............. *H04R 29/00* (2013.01); *G01H 7/00* (2013.01); *G10K 15/08* (2013.01); *H04S 5/00* (2013.01);
(Continued)

(58) Field of Classification Search
CPC ........ H04R 29/00; G10K 15/08; G10K 15/12; H04S 5/00; H04S 2420/01; H04S 7/306; H04S 2400/15; H04S 2400/01; H04S 7/304; G10H 1/0091; G10H 1/125; G10H 2210/281; G10H 2210/301; G10H 7/00; G10H 2250/531; G01H 7/00
(Continued)

(56) References Cited

U.S. PATENT DOCUMENTS 8,238,589 B2 * 8/2012 Hess .................. G01H 3/00
                                                        381/1
9,319,819 B2 * 4/2016 Lee .................... H04S 7/00
(Continued)

OTHER PUBLICATIONS

Menzer et al., "Obtaining binaural room impulse responses from B-format impulse responses using frequency-dependent coherence matching", Feb. 2011; IEEE, vol. 19, No. 2; pp. 396-405.*

*Primary Examiner* — David Ton
(74) *Attorney, Agent, or Firm* — Frommer Lawrence & Haug LLP (57) ABSTRACT

A method of determining acoustical characteristics of a room or venue using a microphone unit having four omnidirectional microphones placed at ends of a tetrahedromounting unit which are equidistant to a middle point of a mounting unit. The four microphones detect impulse responses for each of n sound sources. The detected impulse responses are analyzed: (1) by determining a direct-sound-component direction, delay, and frequency response; (2) by determining an early-reflection direction, delay, and frequency response of each m early reflection; and (3) in view of late-reverberation components by determining a delay and frequency responses. Direct-sound-transmission-function filter parameters are calculated based on the determined direct-sound-component direction, delay, and frequency response M early-reflection-transmission-function filters parameters are calculated based on the m determined directions, delays, and frequency responses of the m early-reflection components. Late-reverberation-transmission-function filter parameters are calculated based on the delay and frequency response of the late-reverberation components.

11 Claims, 5 Drawing Sheets

(51) Int. Cl.
*H04S 5/00* (2006.01)
*H04S 7/00* (2006.01)
*G01H 7/00* (2006.01)
*G10H 1/00* (2006.01)

(52) U.S. Cl.
CPC ............ H04S 7/306 (2013.01); *G10H 1/0091* (2013.01); *G10H 2210/281* (2013.01); *G10H 2250/531* (2013.01); *H04S 7/304* (2013.01); *H04S 2400/15* (2013.01); *H04S 2420/01* (2013.01)

(58) Field of Classification Search
USPC ................ 381/1, 303, 307, 309, 310, 61, 63
See application file for complete search history.

(56) References Cited

U.S. PATENT DOCUMENTS

| | | | |
|---|---|---|---|
| 2004/0025675 A1* | 2/2004 | Miyazaki | G10H 1/125 84/736 |
| 2005/0100171 A1* | 5/2005 | Reilly | G10H 1/0091 381/63 |
| 2007/0147636 A1* | 6/2007 | Oteki | H04S 7/302 381/96 |
| 2008/0232603 A1* | 9/2008 | Soulodre | G01H 7/00 381/63 |
| 2010/0246832 A1* | 9/2010 | Villemoes | G10L 19/008 381/17 |
| 2015/0350801 A1* | 12/2015 | Koppens | H04S 1/005 381/1 |
| 2016/0142854 A1* | 5/2016 | Fueg | H04S 3/004 381/22 |
| 2016/0255453 A1* | 9/2016 | Fueg | G10L 19/008 381/1 |

* cited by examiner

METHOD OF DETERMINING ACOUSTICAL CHARACTERISTICS OF A ROOM OR VENUE HAVING N SOUND SOURCES

FIELD OF THE INVENTION

The present invention relates to a method of determining acoustical characteristics of a room or venue.

It is noted that citation or identification of any document in this application is not an admission that such document is available as prior art to the present invention.

Figure 3:
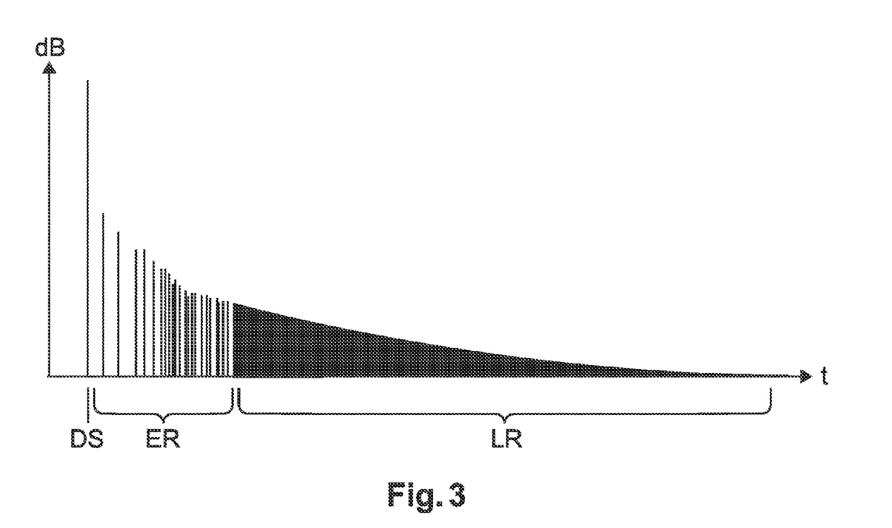
FIG. 3 shows a representation of different sound components of a sound signal.
Figure 4:
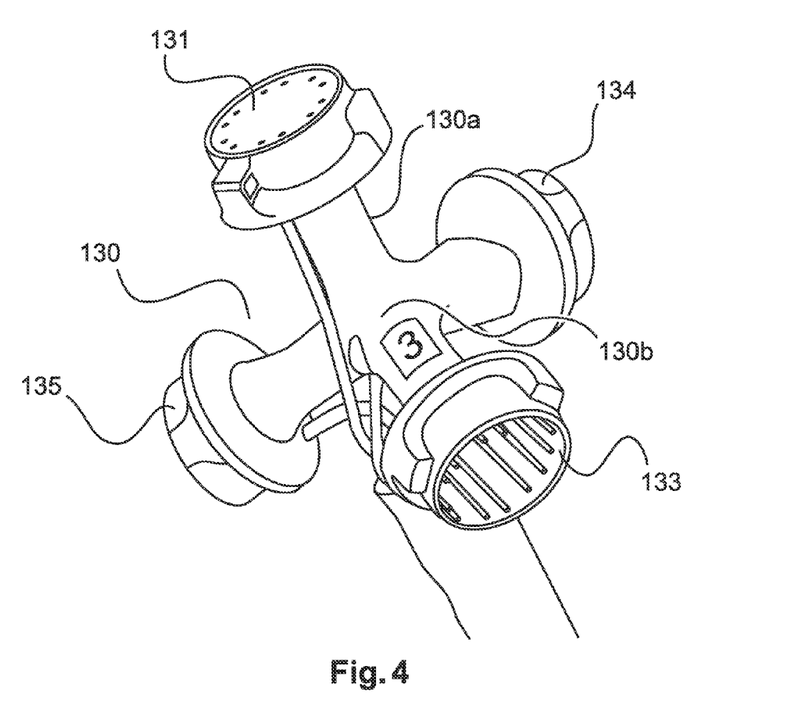
FIG. 4 shows a schematic representation of a microphone unit according to the invention.

Sound as received in a room or venue is a combination of direct and indirect sounds. As shown in FIG. 3, the received sound can be divided into a direct sound DS component, early reflection ER components and late reverberation LR components. If acoustic characteristics of a room are to be simulated when using headphones in order to have a similar audio impression as when standing in the room or venue, the characteristics of the direct sound, early reflections and late reverberations are considered.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112), such that applicant(s) reserve the right to disclaim, and hereby disclose a disclaimer of, any previously described product, method of making the product, or process of using the product.

SUMMARY OF THE INVENTION

It is therefore an object of the invention to provide a method for determining acoustical characteristics of a room or venue.

This object is solved by the current inventive method of determining acoustical characteristics of a room or venue.

Accordingly, a method of determining acoustical characteristics of a room or venue having n sound generators or sound sources is provided. A microphone having four omni-directional microphones are placed at ends of a tetrahedral-mounting unit, wherein the ends of the tetrahedral-mounting unit equidistant to a middle point of the mounting unit. Impulse responses are detected for each of the n sound generators or sound sources by the four microphones of the microphone unit. The detected impulse responses are analyzed in view of direct sound components by determining a direction of the direct sound component, a delay and a frequency response. The detected impulse responses are analyzed in view of early reflection components by determining a direction of early reflections, a delay and a frequency response of each of the n early reflections. The detected impulse responses are analyzed in view of late reverberation components by determining a delay and frequency responses. Filter parameters for a direct sound transmission function filter are calculated based on the determined direction, delay and frequency response of the direct sound components. Filter parameters for m early reflection transmission function filters are calculated based on the m determined directions, delays and frequency responses of the m early reflection components. Filter parameters for a late reverberation transmission function filter are calculated based on the delay and frequency response of the late reverberation components.

According to an aspect of the invention, the direction of the direct sound component and the direction of the m early reflections comprise at least an azimuth angle or a combination of an azimuth angle and an elevation angle.

The invention also relates to a method of generating binaural audio signals based on an audio signal to be reproduced and acoustical characteristics of a room or venue determined by the method of determining acoustical characteristics of a room or venue. Direct sound components are filtered with a filter having characteristics based on the determined direction, delay and frequency response of the direct sound components. From a set of head related transfer functions, one head-related transfer function is selected which corresponds to the direction of the direct sound. m early reflection components are filtered with m filters having filter parameters based on the m determined direction, delay and frequency responses of the early reflection components. From a set of head-related transfer functions, one head-related transfer function which corresponds to the direction of the early reflection for each of the m early reflections is selected.

Accordingly, in order to determine acoustical characteristics of a room or venue, a microphone unit having four omni-directional microphones mounted on a tetrahedral mounting unit is arranged at a predetermined position within the room or venue. The room or venue has n sound generators which could be for example loud speakers. For each of the n sound generators, a dedicated impulse response measuring is performed by the microphone unit. Therefore, the microphone will provide four output signals, namely one for each of the four microphones for each of the n sound sources. The output signals of the four microphones contain a representation of the transmission behaviour of the audio signal. The audio signals as detected by the four microphones will contain direct sound components, early reflection components and late reverberation components. For the direct sound components, there is a direct sound path from one of the sound generators to each of the microphones. Early reflection components can be sound paths from a speaker which are reflected at a wall, for example a single time and then reach the microphone unit. Early reflection components are sound components where the direction from which the sound component reaches the microphone can be detected. Late reverberation components typically have sound paths which are reflected several times from walls etc. before they reach the microphone unit. The measuring of the direct sound, the early reflections and the late reverberations are performed for each of the n sound generators. Based on the impulse response measurements of the four microphones of the microphone unit for each of the n sound sources or sound generators, the acoustical characteristics of a room or a venue can be determined.

The invention relates to the idea to simulate the same acoustical experience a person is experiencing in a room or venue when a person is using headphones or earphones. Thus, acoustical characteristics of a room or a venue need to be transformed into a binaural signal. In other words, according to the invention, the audio impression of a room or venue is simulated to a user who is wearing headphones. The room or venue which is to be simulated comprises n sound generators. In order to be able to simulate the same audio impression, a microphone unit is placed at a desired position within the room or venue and each of the n sound generators emits a specific sound signal, namely an impulse after each other. The impulse response is detected by the microphone unit. The microphone unit comprises four omnidirectional microphones which are placed at the ends of a tetrahedral. The detected signals from the microphone unit are processed in view of direct sound, early reflections and late reverberations in order to obtain a binaural signal. During this processing, head-related transfer functions are also considered.

A head-related transfer function HRTF corresponds to a response characterising how an ear receives a sound from a point in space. Two head-related transfer functions HRTF for the two ears of a user can be used to synthesize a binaural sound that can appear to come from a particular point in space. The head-related transfer function HRTF describes how a sound from a specific point will arrive at an ear of a user.

Typically, head-related transfer functions can be measured in an anechoic chamber with changing angles or sound direction to minimize an influence of early reflections and reverberations on the measured response.

According to the invention, the direction of the sound can be determined by an azimuth angle or a combination of an azimuth angle and an elevation angle. If the azimuth as well as elevation angle is used, then the direction of the sound is three-dimensional.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
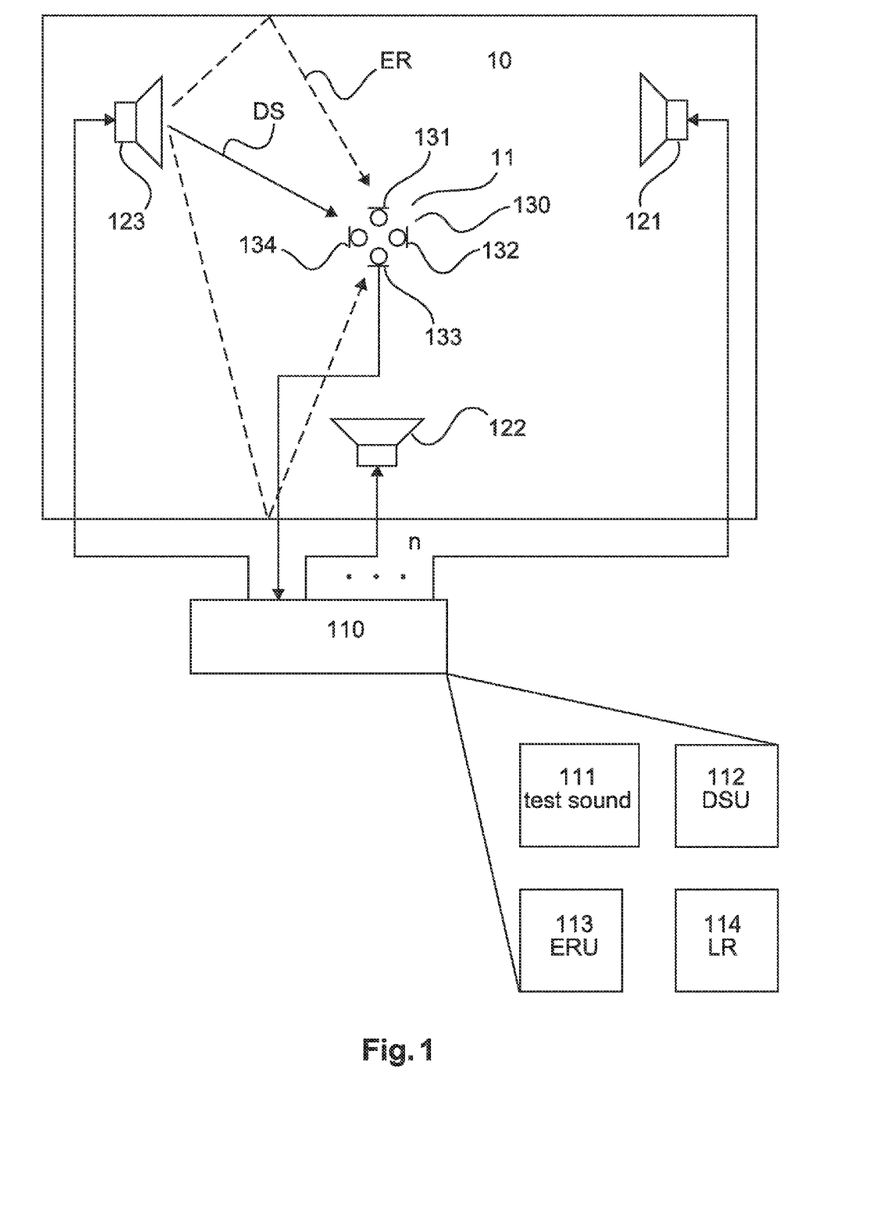
FIG. 1 shows a schematic representation of a system for determining acoustical characteristics of a venue.

FIG. 1 shows a schematic representation of a system for determining acoustical characteristics of a venue or room. In FIG. 1, a venue or room 10 is depicted with (n=3) three loudspeakers 121, 122, 123. At a first position 11 in the room 10, a microphone unit 130 with four microphones 131-134 is provided. The four microphones 131-134 are positioned on a tetrahedral receiving unit. The four arms of the tetrahedral receiving unit have identical lengths 130a and are coupled at a middle point 130b. The microphone 130 as well as the loudspeakers 121-123 are each coupled to a control and processing unit 110. The control and processing unit 110 can control the measuring procedure. The measuring procedure is repeated for each of the n=3 loudspeakers 121-123 which each correspond to one of the n audio channels. It should be noted that the number of sound generators or sound sources in a room or a venue is not limited to three.

The control and processing unit 110 will initiate an impulse response measurement for each of the four microphones 131-134. In other words, for each of the n channels or n loudspeakers, four different output signals, namely impulse responses from the microphone unit are obtained. As depicted in FIG. 1, the microphone unit 130 will detect the direct sound DS from the loudspeaker 123 as well as early reflections ER. In addition, the microphone unit 130 will also detect late reverberations which are not explicitly depicted in FIG. 1.

The direct sound path DS is a sound path from one of the loudspeakers directly to the microphone unit 130. The early reflection sound path ER is a sound path from one of the loudspeakers with at least one reflection at one of walls or other objects. As for example shown in FIG. 3, the direct sound DS will reach the microphone units 130 before the early reflections ER and the late reverberation LR. Sound components are considered as early reflections if the direction from which the sound components reach the microphone unit is detectable. Late field reverberation components are sound paths which have been reflected several times before they reach the microphone unit.

In FIG. 3, a typical measured impulse response for a single channel audio signal at one of the four microphones is depicted. Such an impulse response with the characteristic direct sound DS, early reflections ER and late reverberations LR will be detected by the microphones 131-134.

During the measurements as performed according to FIG. 1, impulse response measurements are performed for each of the sound generators or sound sources to each of the four microphones of the microphone unit. In a direct sound analyzing unit 112, the direct sound components DS of the detected impulse response is analyzed. The direct sound DS can be easily analyzed as this sound component is the first sound which is detected by the microphone unit in the impulse response. Due to the fact that the four microphones 131-134 are omni-directional, the impulse response for the direct sound components is substantially equal for all four microphones. However, it is not identical. This is due to the fact that due to the spatial arrangement of the four microphones 131-133, the direct sound components will reach the respective four microphones 131-134 at different points of time. Based on the time differences between the four microphones 131-134, the direction of the direct sound can be determined. The direction of the direct sound can be determined as an azimuth angle. Optionally, the direction of the direct sound can be determined as a combination of an azimuth angle and an elevation angle such that the direction of the direct sound can be a three-dimensional direction.

In an early response analyzing unit 113, the early reflection ER components of the impulse response are analyzed. It should be noted that a number m early reflections may be present in the impulse response detected by the microphone unit 130. For each of the m early reflections, a mapping is performed by correlating the impulse responses. In addition, each early reflection ER is analyzed as described above for the direct sound DS in order to detect the direction of the early reflection ER. Accordingly, each of the m early reflections ER has its own associated direction. The directions of the m early reflections can be determined as an azimuth angle or optionally as a combination of an azimuth angle and an elevation angle such that a three-dimensional direction can be determined. Accordingly, for each channel m early reflections may be present and need to be analyzed. The number m can be adapted according to the available processing resources. The number of early reflections can be the same or different for each of the channels, i.e. for each of the sound generators or sound sources.

The m different early reflections ER can be detected as each of the m early reflections ER reach the microphone unit a different point of time. Thus, each of the m early reflections ER has a different delay.

The direct sound analyzing unit 112 and the early reflection analyzing unit 113 are each adapted to determine a frequency response based on the impulse response measurements of the microphone unit 130. Accordingly, the direct sound analyzing unit 112 determines a frequency response for the direct sound path DS. The early reflection analyzing unit 113 determines a frequency response for each of the m early reflections ER. Accordingly, the direct sound analyzing unit 112 and the early reflection analyzing unit 113 calculate m+1 frequency responses. Optionally, the frequency responses of the m early reflections ER can be determined by comparing the frequency response of each of the m early reflections with the frequency response of the direct impulse.

Furthermore, the late reverberation analyzing unit 114 is present in the control and processing unit 110. According to the invention, a single reverberation model for each of the channels is provided which can be valid for all directions. This is considered to be sufficient as it is not possible for a person to detect a specific direction of the late reverberations LR. Optionally, the late reverberation model comprises a delay and a frequency response. The late field reverberation model can for example be implemented as a feedback delay network.

Figure 2:
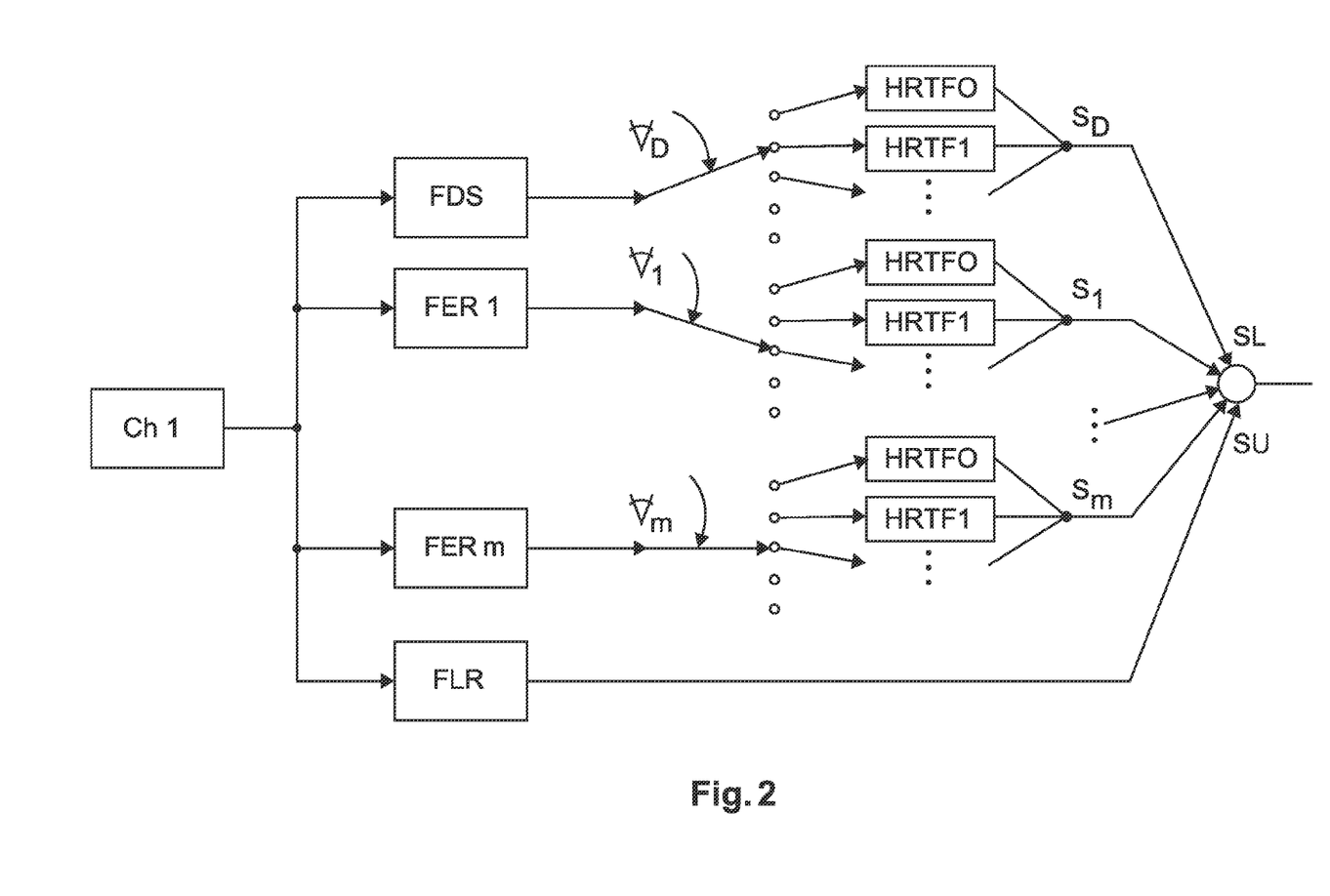
FIG. 2 shows a schematic block diagram of a signal processing according to the invention.

In FIG. 2, the signals as measured by the control and processing unit 111 for a first channel ch1 are used as input signal. These signals can for example be the impulse response as measured by the microphone unit 130 of FIG. 1 when for example only the audio signal from the first loudspeaker 121 is reproduced. Accordingly, the processing according to FIG. 2 must be repeated for each of the channels as measured by the microphone unit 130 in FIG. 1. It should be noted that although in FIG. 1 only three sound generators, namely loudspeakers 121-123 are depicted, the number of sound generators or sound sources can be higher or lower.

The direct sound analyzing unit 112 outputs a direction, a delay and a frequency response. The early reflection analyzing unit 113 outputs m-times a direction (e.g. azimuth angle or a combination of azimuth and elevation angle), a delay and a frequency response. The direct sound path as well as the m early reflection paths (in other words, the corresponding detected impulse responses) are undergoing m+1 transfer functions. Each of these transfer functions includes an adding of the corresponding delay for the path and a filtering of the detected signal from the microphone units with a filter unit in order to apply the frequency responses. In case of the direct sound path DS, a transfer function FDS with one delay and a frequency response is provided. Each of the m early reflections is associated to a specific delay and frequency response. Thus, m delays and frequency responses corresponding to m transfer functions FER1-FERm are provided. Furthermore, a filter FLR for the late field reverberations is provided as a transfer function having a single delay and the frequency response.

A set of previously determined head-related transfer functions HRTF is stored. Each of these head-related transfer functions represents an impulse response measured for an ear of an artificial head in an anti-echoic chamber for sound coming from a specific direction. This can for example be done by measuring in a plane of a level of the artificial head in steps of 5° resulting in 72 head-related transfer functions HRTF. Each of the head-related transfer functions HRTF includes a delay and a frequency response. The delay corresponds to the sound propagation from the head to the ears.

Optionally, the head-related transfer functions can be measured in an anti-echoic chamber with a microphone being located at the entrance of an ear of a person instead of an artificial head.

As the direct sound analyzing unit 112 and the early reflections analyzing unit 113 have determined the direction for the direct sound DS as well as the m directions (azimuth angle or a combination of azimuth and elevation angle) for the m early reflections ER, these m+1 directions can be translated into m+1 directions relative to the ear of the user. If the direction of the sound is known, then from the set of head-related transfer functions, that head-related transfer function is chosen which corresponds to this direction (azimuth angle or a combination of azimuth and elevation angle). Accordingly, each of the m+1 audio signals is processed by the head-related transfer functions HRTF which correspond to the direction (azimuth angle or a combination of azimuth and elevation angle) as analyzed in view of the direct sound path and the m early reflections. It should be noted that the head-related transfer functions for the left and the right ear are different.

Optionally, if the headset or headphone is equipped with a head tracker (which can detect an azimuth angle or a combination of the azimuth and elevation angle), this tracker information can be used to modify the head-related transfer function. This is advantageous as it improves the simulation of the head movements as made in the simulated venue.

As seen in FIG. 2, the late reverberation path does not contain a head-related transfer function. This is due to the fact that the late reverberations do not contain a specific direction. The outputs of the different head-related transfer functions and the output of the transfer function of the late reverberations are summed in a summing unit SU to obtain a signal SL. This is performed for the left ear (i.e. SL) as well as for the right ear resulting in an output signal SR. Thus, the output signal for the left ear and the output signal for the right ear is achieved.

As mentioned above, the processing as shown in FIG. 2 is a processing for one channel. Therefore, this processing must be performed for each of the channels. Furthermore, the final signal for the left and right ear will be a summation of the output signals SL and SR for each of the n channels.

It should be noted that the direction information, the delay information and the frequency response information can be stored or transmitted according to the invention. The analysis of the measured 4×n impulse responses and their translation into the simulation model only need to be executed once.

According to the invention, the head related transfer function may contain information regarding the direction of the sound, wherein the direction of the sound can be described as an azimuth angle or as a combination of an azimuth angle and a elevation angle. If the combination of azimuth angle and elevation angle is chosen, then a three-dimensional direction of the sound can be achieved.

According to the invention, a headphone or earphone is provided which comprises a head tracker detecting an azimuth angle or a combination of azimuth and elevation angle. In the headset, the head related transfer functions can be stored and can be associated to the angle (azimuth and/or elevation angle) the head tracker has determined such that an audio signal can be reproduced by the headphone or earphone which is filtered based on the head related transfer functions.

Figure 5:
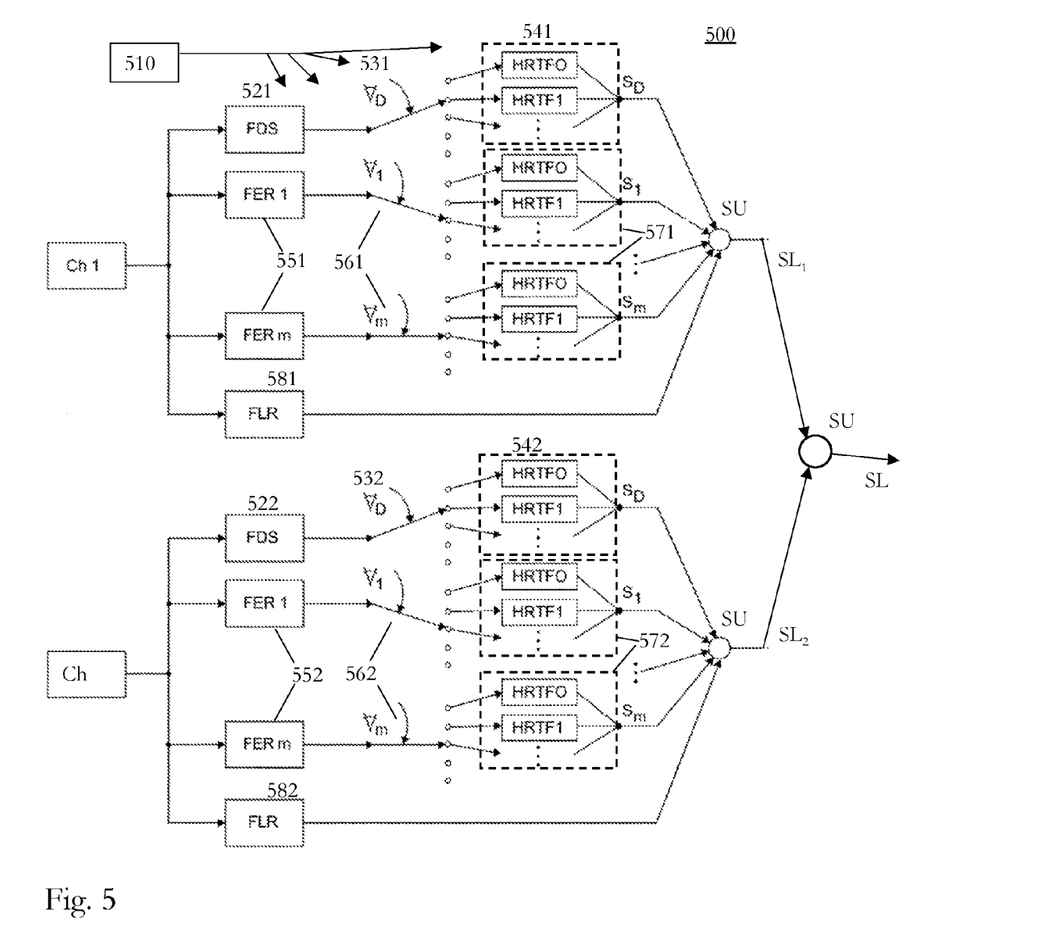
FIG. 5 shows a block diagram of an apparatus for generating binaural audio signals to be reproduced via a headphone or earphone, according to one embodiment of the invention.

FIG. 5 shows a block diagram of an apparatus for generating binaural audio signals to be reproduced via a headphone or earphone, according to one embodiment of the invention. The apparatus 500 comprises a storage 510, and for each of two channels Ch1,Ch2 corresponding to two sound sources: a first filter 521,522 adapted for filtering direct sound components, a first selector 531,532 adapted for selecting a HRTF for the filtered direct sound component, a HRTF processing unit 541,542 adapted for processing the filtered direct sound component, one or more second filters 551,552 adapted for filtering one or more early reflection components, a second selector 561,562 adapted for selecting a HRTF for each of the one or more early reflection components, a HRTF processing unit 571,572 for each of the one or more filtered early reflection components, and a channel summing unit $SU_1,SU_2$. Further, the apparatus 500 comprises a final summing unit $SU_F$, adapted for summing output signals of the channel summing units $SU_1,SU_2$, wherein a final output signal $SL_F$, for one ear of the headphone or earphone is obtained.

It is clear that two or more or all of the HRTF processing units 541,542,571,572 may but need not be implemented as a single processing unit.

The storage 510 is adapted for providing acoustical characteristics data of a room or venue having at least two sound sources, wherein for each of the at least two sound sources direct sound filter parameters, early reflection filter parameters, a direction of a direct sound and a direction of early reflections for controlling the first selectors and second selectors respectively are provided.

The first filter 521,522 adapted for filtering direct sound components is configured by the direct sound filter parameters obtained from the storage 510.

The first selector 531,532 is adapted for selecting, from a set of head-related transfer functions 541,542 and according to control data obtained from the storage 510, one head-related transfer function which corresponds to the direction of the direct sound.

The first HRTF processing unit 541,542 adapted for processing the filtered direct sound component processes the filtered direct sound component according to the selected head-related transfer function selected by the respective first selector 531,532 which corresponds to the direction of the direct sound. The first HRTF processing unit 541,542 provides a processed filtered direct sound component.

The one or more second filters 551,552 perform filtering one or more early reflection components, wherein one second filter per early reflection component is used, and are configured by the early reflection filter parameters obtained from the storage 510.

Each of the second selectors 561,562 for the one or more early reflection components is adapted by configuration data obtained from the storage 510 for selecting, from a set of head-related transfer functions, one head-related transfer function which corresponds to the direction of the early reflection for one of the one or more early reflection components.

Each of the HRTF processing units 571,572 for the one or more filtered early reflection components processes the respective filtered early reflection components according to the respective selected head-related transfer function as selected by the respective second selector 561,562, corresponding to the direction of the early reflection component. Each of the HRTF processing units 571,572 provides a processed filtered early reflection component.

Each of the channel summing units $SU_1,SU_2$ is adapted for summing up the processed filtered direct sound component and the one or more processed filtered early reflection components of the respective channel, wherein a binaural output signal $SL_1,SL_2$ per sound source, i.e. per channel, is obtained.

The final summing unit $SU_F$, is adapted for summing up the binaural output signals of each of the two or more channel summing units $SU_1,SU_2$, wherein the final binaural signal $SL_F$, is obtained.

In one embodiment, the apparatus 500 further comprises for each of the channels Ch1,Ch2 corresponding to at least two sound sources a third filter 581,582 adapted for filtering late reverberation components. The third filter 581,582 is configured by the late reverberation filter parameters obtained from the storage, and provides filtered late reverberation components. In this embodiment, the channel summing unit $SU_1,SU_2$ further adds the filtered late reverberation components to the processed filtered direct sound component and the one or more processed filtered early reflection components, and the storage 510 further provides late reverberation filter parameters for each of the at least two sound sources.

Figure 6:
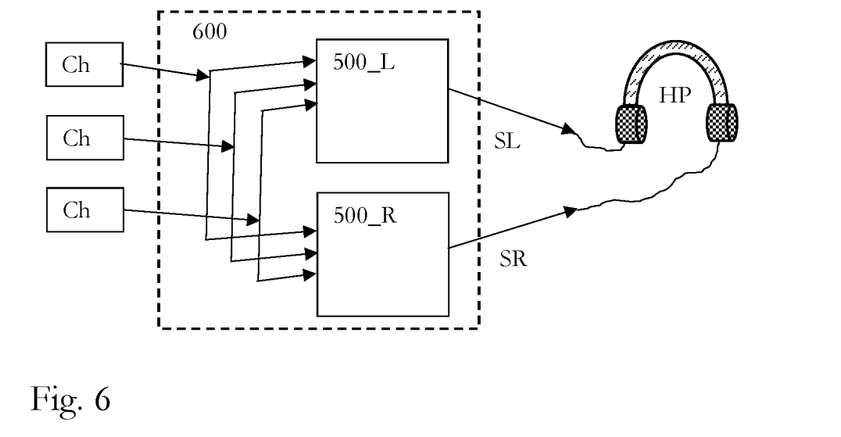
FIG. 6 shows an embodiment of the invention for a headphone or earphone HP that can provide sound to both a left ear and a right ear.

The above-mentioned final binaural signal is for one ear of a headphone or earphone. FIG. 6 shows an embodiment of the invention for a headphone or earphone HP that can provide sound to both a left ear and a right ear. The apparatus 600 comprises each of the filters, selectors, processing units and summing units as described above for each ear separately. However, exemplarily three channels Ch1,Ch2,Ch3 corresponding to three sound sources are used. Thus, the apparatus 600 in this embodiment comprises one processing block 500 L that provides a signal $SL_F$, for the left ear of the headphone or earphone HP, and one processing block 500 R that provides a signal $SL_R$ for the right ear of the headphone or earphone HP.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method of generating binaural audio signals to be reproduced via a headphone or earphone, comprising the steps of:

automatically determining acoustical characteristics of a room or venue having at least two sound sources, wherein, for each of the at least two sound sources direct sound filter parameters, early reflection filter parameters, a direction of a direct sound, and a direction of early reflections are obtained; and for each of the at least two sound sources:
  filtering direct sound components with a filter having the direct sound filter parameters;
  automatically selecting, from a set of head-related transfer functions, one head-related transfer function which corresponds to the direction of the direct sound;
  processing the filtered direct sound component in the selected head-related transfer function which corresponds to the direction of the direct sound;
  filtering one or more early reflection components with one or more filters having the early reflection filter parameters, wherein one filter per early reflection component is used;
  automatically selecting, from a set of head-related transfer functions, one head-related transfer function which corresponds to the direction of the early reflection for each of the one or more early reflection components;
  processing each of the one or more filtered early reflection components in the respective selected head-related transfer function which corresponds to the direction of the respective early reflection; and
  summing up, in a channel summing unit, the processed filtered direct sound component and the one or more processed filtered early reflection components, wherein a binaural output signal per sound source is obtained;

wherein the method further comprises a step of: summing up, in a final summing unit, the binaural output signals of each of the two or more sound sources, wherein the binaural signal is obtained.

2. The method of claim 1;
wherein the headphone or earphone has two earphone channels, with one earphone channel for a left ear and one earphone channel for a right ear, and wherein the steps of claim 1 are performed for each earphone channel separately.

3. The method of claim 1;
wherein, in said determining acoustical characteristics of a room or venue, late reverberation filter parameters are obtained for the at least two sound sources, the method further comprising for each of the at least two sound sources steps of:
  filtering late reverberation components with a filter having the late reverberation filter parameters, wherein filtered late reverberation components are obtained; and
  summing up the filtered late reverberation components together with the processed filtered direct sound component and the one or more processed filtered early reflection components.

4. The method of claim 3;
wherein the late reverberation filter parameters are the only filter parameters that are valid for all channels.

5. The method of claim 3;
wherein the headphone or earphone has two earphone channels, with one earphone channel for a left ear and one earphone channel for a right ear, and wherein the steps of claim 3 are performed for each earphone channel separately.

6. The method of claim 1;
wherein each of the direct sound filter parameters and early reflection filter parameters comprise a delay parameter and a parameter defining a frequency response.

7. An apparatus for generating binaural audio signals to be reproduced via a headphone or earphone, comprising:
  a storage configured to provide acoustical characteristics data of a room or venue having at least two sound sources;
wherein, for each of the at least two sound sources, direct sound filter parameters, early reflection filter parameters, a direction of a direct sound and a direction of early reflections are provided;
wherein each of the at least two sound sources comprises:
  a first filter adapted to filter direct sound components, the first filter being configured by the direct sound filter parameters;
  a first selector adapted to select, from a set of head-related transfer functions, one head-related transfer function which corresponds to the direction of the direct sound;
  a head-related transfer function processing unit adapted to process the filtered direct sound component according to the selected head-related transfer function which corresponds to the direction of the direct sound;
  one or more second filters adapted to filter one or more early reflection components, the one or more second filters being configured by the early reflection filter parameters, wherein one second filter per early reflection component is used;
  a second selector for each of the one or more early reflection components, each second selector being adapted to select, from a set of head-related transfer functions, one head-related transfer function which corresponds to the direction of the early reflection for one of the one or more early reflection components;
  one or more head-related transfer function processing units adapted to process each of the one or more filtered early reflection components according to the respective selected head-related transfer function which corresponds to the direction of the respective early reflection; and
  a channel summing unit adapted to sum up the processed filtered direct sound component and the one or more processed filtered early reflection components, wherein a portion of a binaural output signal per sound source is obtained;

wherein the apparatus further comprises:
  a final summing unit adapted to sum up the portions of a binaural output signals of each of the two or more channel summing units, wherein the binaural signal for an earphone channel of the headphone or earphone is obtained.

8. The apparatus of claim 7;
wherein the headphone or earphone has two earphone channels, with one earphone channel for a left ear and one earphone channel for the right ear; and
wherein the apparatus comprises each of the filters, selectors, processing units, and summing units of claim 7 for each earphone channel separately.

9. The apparatus of claim 7;
wherein each of the direct sound filter parameters and the early reflection filter parameters comprise a delay parameter and a parameter defining a frequency response.

10. The apparatus of claim 7;
wherein said storage is further configured to provide late reverberation filter parameters for the at least two sound sources;
wherein each of the at least two sound sources further comprises:
 a third filter adapted to filter late reverberation components, the third filter being configured by the late reverberation filter parameters and the third filter providing filtered late reverberation components; and
wherein said channel summing unit is further configured to add the filtered late reverberation components to the processed filtered direct sound component and the one or more processed filtered early reflection components.

11. The apparatus of claim 10;
wherein the late reverberation filter parameters are the only filter parameters that are valid for all channels.

* * * * *